(12) United States Patent
Choo et al.

(10) Patent No.: US 9,959,110 B2
(45) Date of Patent: May 1, 2018

(54) FIRMWARE UPDATING METHODS AND APPARATUS FOR OPTICAL TRANSCEIVER

(71) Applicant: Starview International PTE LTD, Singapore (SG)

(72) Inventors: Yuh Joo Choo, Singapore (SG); Leng Kee Wilson Tan, Singapore (SG)

(73) Assignee: STARVIEW INTERNATIONAL, PTE. LTD, Singapore (SG)

( * ) Notice: Subject to any disclaimer, the term of this patent is extended or adjusted under 35 U.S.C. 154(b) by 0 days. days.

(21) Appl. No.: 15/110,922

(22) PCT Filed: May 28, 2014

(86) PCT No.: PCT/SG2014/000236
§ 371 (c)(1),
(2) Date: Jul. 11, 2016

(87) PCT Pub. No.: WO2015/183182
PCT Pub. Date: Dec. 3, 2015

(65) Prior Publication Data
US 2016/0335072 A1    Nov. 17, 2016

(51) Int. Cl.
*G06F 9/44* (2018.01)
*G06F 9/445* (2018.01)
*H04B 10/40* (2013.01)

(52) U.S. Cl.
CPC ............... *G06F 8/65* (2013.01); *H04B 10/40* (2013.01)

(58) Field of Classification Search
CPC ....................................................... G06F 8/65
See application file for complete search history.

(56) References Cited

U.S. PATENT DOCUMENTS

| | | | | |
|---|---|---|---|---|
| 2002/0009905 A1* | 1/2002 | Poplawski | ........... | C07D 491/22 439/76.1 |
| 2002/0083228 A1* | 6/2002 | Chiloyan | .............. | G06F 9/4411 710/9 |
| 2004/0103340 A1* | 5/2004 | Sundareson | ........ | G06F 11/1433 714/6.3 |
| 2005/0158100 A1* | 7/2005 | Yamaguchi | ............... | G06F 8/65 400/62 |
| 2005/0242925 A1* | 11/2005 | Zaretsky | ............. | G06F 11/0706 340/10.1 |
| 2006/0093366 A1* | 5/2006 | Hahin | .................... | H04B 10/40 398/135 |
| 2006/0153569 A1 | 7/2006 | Dybsetter et al. | | |
| 2010/0027991 A1 | 2/2010 | Hosking | | |
| 2010/0028015 A1 | 2/2010 | Hosking | | |

OTHER PUBLICATIONS

International Search Report, PCT/SG2014/000236, dated Aug. 6, 2014.

* cited by examiner

*Primary Examiner* — Hang Pan
(74) *Attorney, Agent, or Firm* — Royse Law Firm, PC (57) ABSTRACT

An optical transceiver is programmed by downloading firmware data from a remote provider onto a computing device local to the transceiver and electronically writing data derived from the downloaded firmware data onto the transceiver using a hardware device connected electrically to the computing device, the transceiver being electrically connected to the hardware device.

13 Claims, 5 Drawing Sheets

FIRMWARE UPDATING METHODS AND APPARATUS FOR OPTICAL TRANSCEIVER

CROSS REFERENCE TO RELATED APPLICATION

This application is a 35 U.S.C. 371 national stage filing from International Application No. PCT/SG2014/000236 filed May 28, 2014.

FIELD OF THE INVENTION

The invention relates to the field of communications. Embodiments relate to interfacing between electrical devices and optical devices by use of optical transceivers.

One example of the field of application of the invention relates to systems in which a device, hereinafter referred to as a "host device", such as a computer, a switch or a router operates using electrical signals but communicates using input and output signals over one or more optical fibres. The interface device permitting this to occur is referred to as an optical transceiver. There is a large number of protocols by which communication takes place. These include, without restriction, Ethernet, SONET, SDH, Gigabit Ethernet, Fibre Channel, Passive Optical Network, Radio and Digital TV.

BACKGROUND TO THE INVENTION

Optical transceivers include, without restriction, devices known as SFP, SFP+ and XFP devices. Such transceivers have an electrical connection for mating with a slot of the host device, and a fibre connector for connection of a single or multimode optical fibre. The transceivers may be adapted for use with a particular type of fibre, for different optical wavelengths to and from the fibre or for communication over different distances. The transceivers have on-board memory storing firmware data that has an effect on operation of the transceiver, and that may identify the manufacturer of the transceiver. This data may be stored in a flash memory, or EEPROM, on the transceiver. Some manufacturers of host devices seek to restrict users' choice of optical transceiver by programming their host units to query the identity of a transceiver when it is plugged in. The host unit may be programmed so as not to interact with transceivers unless their identity corresponds to a transceiver of that manufacturer.

Prior art documents that came to the attention of the inventors after making the invention include U.S. Pat. No. 8,582,974, US2006/093371 and US2012/0313744.

U.S. Pat. No. 8,582,974 discloses an operational optical transceiver configured to update operational firmware using an optical link of the transceiver. The optical transceiver includes at least one processor and a system memory capable of receiving firmware. The optical transceiver receives an optical signal over the optical link containing the update firmware. The optical transceiver then recovers the firmware from the optical signal. Finally, the optical transceiver provides to the system memory the recovered firmware, which when executed by the at least one processor alters the operation of the transceiver.

US2006/093371 discloses an environment that includes a host computing system ("the host"), a network, a remote computing site, and an optical transceiver having a system memory and at least one processor. The host determines that microcode that governs the behaviour of an optical transceiver is desired to be purchased. A request to purchase the microcode is sent over the network from the host to the remote computing site. The remote computing site responds to this request by providing the host information by which the purchased microcode may be accessed. The host may then access the microcode. Finally, the host provides the microcode to the optical transceiver memory where it may later be executed by the processor.

US2012/0313744 relates to a system and method of re-programming memory, and in particular, to wirelessly re-programming software, such as the application code, residing in memory of a trainable transceiver. The wireless re-programming of memory allows for software in the trainable transceiver to be updated or replaced from a remote location, where a direct or wired connection to the product is not otherwise available.

There is a need to be able to update/change firmware data on an optical transceiver in a simple and controllable way.

SUMMARY OF THE INVENTION

In a first aspect there is provided a method for programming a transceiver device by downloading firmware data from a remote provider onto a computing device local to the transceiver and electronically writing data derived from the downloaded firmware data onto the transceiver using a hardware device into which the transceiver is plugged.

The method may comprise communicating with the remote provider by providing credentials to software running on the computing device, the credentials including data indicative of the optical transceiver concerned, whereby the remote provider makes the firmware available for download by the computing device.

The communicating step may comprise contacting a web presence of the remote provider over the Internet.

The web presence may comprise a cloud server.

In a second aspect there is provided an electrical device adapted to interface between a computer and an optical transceiver, the optical transceiver having a memory storing firmware data, the electrical device being adapted to access the memory and to write firmware data to the memory from the computer.

The electrical device may be operable to write new firmware data to the memory.

In a third aspect there is provided a method of operating an optical transceiver having a memory storing firmware data, the method comprising providing a computer and an electrical device for interface between the optical transceiver and the computer, the computer being programmed to carry out the following steps:
 access the memory of the optical transceiver via the electrical device to read the firmware data of the memory;
 store a copy of the firmware data;
 access new firmware data; and
 carry out a writing step to write the new firmware data to the memory.

The step of accessing new firmware data may comprise downloading new firmware data.

The step of downloading new firmware data may comprise providing information to software running on the computer, the software thereby contacting a cloud server of a remote provider to retrieve the desired new firmware data.

The method may also comprise, after carrying out the writing step, re-reading stored data from the memory and re-writing the stored copy of firmware data in event of an error.

The method may comprise after carrying out the writing step, detecting an error, performing the writing step again for a set number of times and then if an error is detected re-writing the stored copy of firmware data.

The method may comprise downloading a DLL to the computer.

The DLL may permit control of the electrical device.

The method may comprise downloading a GUI and using the GUI in effecting other steps of the method.

In a fourth aspect the method comprises providing a computing device such as a laptop having stored thereon at least one set of firmware data and using a device of the second aspect to write firmware data to an optical transceiver.

In a fifth aspect there is disclosed a method of applying firmware to a device, wherein the device is accessible via a non-USB protocol, the method comprising identifying firmware, downloading the firmware over a communications link onto a computer having a USB port, connecting the device to the USB port via an interface device operable to interface between the USB protocol and the non-USB protocol and writing the firmware to the device.

The method may comprise downloading a DLL to the computer.

The DLL may permit control of the interface device.

The method may comprise downloading a GUI and using the GUI in effecting other steps of the method.

Some embodiments allow engineers/technicians to reflash EEPROM in the field, so that technical issues with the use of SFP/SFP+/XFP devices can be resolved on the spot, without returning the items back to the factory.

In another aspect, (hardware) apparatus is provided for implementing the disclosed techniques.

BRIEF DESCRIPTION OF THE DRAWINGS

The invention will now be described by way of example only. Reference is made to the accompanying drawings in which.

DETAILED DESCRIPTION OF AN EMBODIMENT

In an exemplary but non restrictive embodiment of the proposed process, the user will first contact the manufacturer, providing the serial number of the transceiver to be re-flashed and details of the new firmware type (e.g. Juniper or Cisco, XFP) whose data is to be flashed. This information is, in one embodiment, stored in a manufacturer's database for future reference or verification. The new firmware is created by the manufacturer at the backend and prepared for upload into a server, for example a cloud server (31—see FIG. 1). In one embodiment, the new firmware is selected manually. In others, information provided to the manufacturer is used to automatically select the correct firmware. In some cases the firmware is held in a library by the manufacturer.

Figure 1:
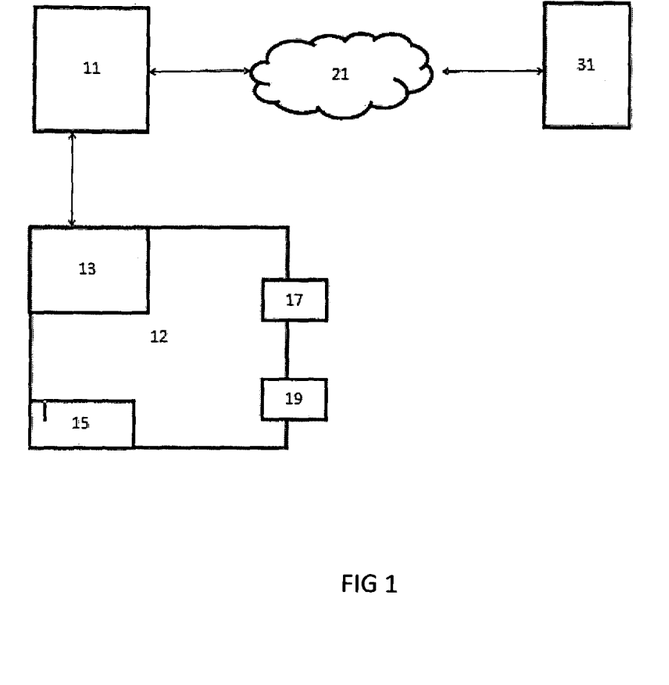
FIG. 1 is a block schematic view of an arrangement for amending firmware data of an optical transceiver.

A first-time user purchases or otherwise obtains an interface board (12—see FIG. 1). For security, a corresponding unique HW ID is written to an EEPROM (15—see FIG. 1) of the board before despatch. The first-time user downloads or otherwise obtains a self-extracting software into a computing device which comprises USB slots, e.g. laptop. The software will contain a GUI (including client-server), a DLL for cooperation with a bridging module 13) of the board and the driver for the bridging module (13)

The bridging module acts like a slave. It is the GUI and its associated program that dictates the flow.

Referring to FIG. 1, an arrangement (100) has a computer (11) such as a laptop connected to a board (12) for interfacing to optical transceivers. The board (12) has two sockets (17, 19) respectively for XFP and SFP transceivers. It also has the EEPROM (15) and a bridging module (13) on board, connecting to the computer (11). The EEPROM stores an ID of the board (12). In one embodiment the connection from the computer (11) is a USB protocol connection; communication to the transceivers is via the I2C protocol and the bridging module (13) converts between USB and I2C protocols. In one embodiment the bridging module is a USB-ISS bridging module made by Robot Electronics.

The computer (11) has an Internet connection via the Internet (21) to the cloud server (31).

Figure 2:
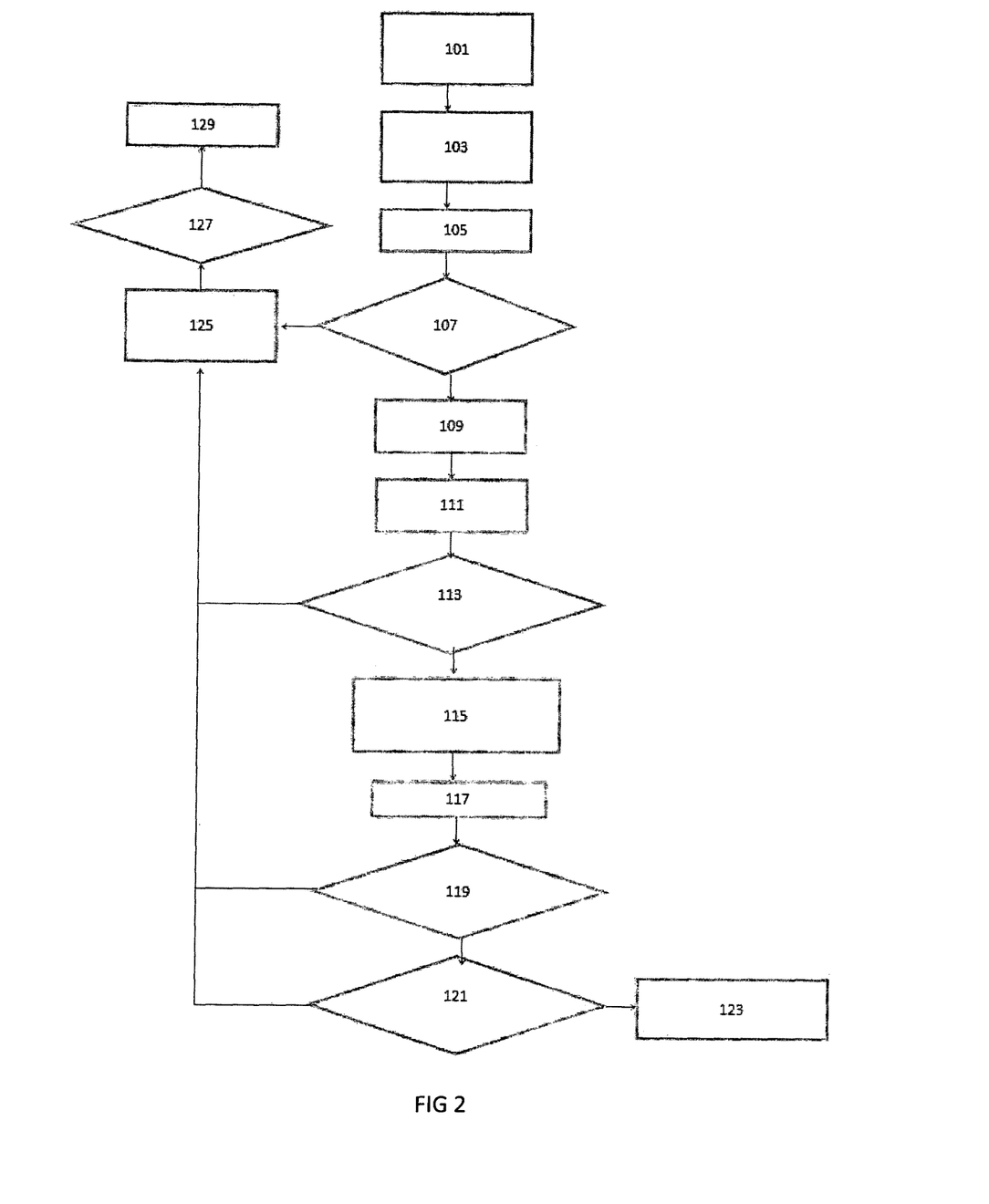
FIG. 2 is a flowchart showing a first part of a method for amending firmware data of an optical transceiver.

Referring to FIG. 2, at (101) a user installs control software in computer (11). At (103) User launches a GUI that is installed in computer. At (105) user logs in with log-in credentials.

At (107) the software tests to determine if credentials are verified by logging onto the cloud server (31). If the cloud server confirms the credentials are correct, operation proceeds to (109) in which communication is initialised, and then to (111) where the board ID is read from the EEPROM (15) and information indicative of the transceiver is input. In one embodiment the serial number of the transceiver is entered by hand, by a scanner or the like. In another embodiment the board (12) is programmed to read out from a transceiver connected to one of the two sockets (17,19) the serial number of the transceiver or other data indicative of it. The serial number is stored at a particular register location. In some embodiments it is compared if the program key matches the serial number of the transceiver connected. At (113) the board ID and serial number are verified by reference to data in the cloud server (31), which (115) logs the user details, IP address, board ID and device serial number, and (117) the server requests the user to input the previously obtained key. This key will have been obtained from the manufacturer of the optical transceiver, for example by mail, by email or by telephone. Each set of firmware is associated to a unique key sometimes referred to herein as "Progkey".

Once the key has been input (117) this is transmitted to the server (31) that checks (119) the key exists in a database.

If the answer is "yes" then at (121) the server checks the key to see it is consistent with the transceiver serial number. Provided the answer is positive control passes to block (123) which enables the user to download the corresponding firmware for local storage. In one set of embodiments the computer (11) is programmed to store the downloaded new firmware data on a permanent basis. In other preferred embodiments the firmware data is only stored temporarily, and the computer (11) is programmed to flush the firmware data out of store once the rewriting process is complete, or if any of the below checks are failed.

If any check, e.g. of correct credentials, validity of board ID, device serial number, Progkey present in database and Progkey being consistent with the device serial number, fail, then control passes to error message handling (125) and the user is exited from the GUI (127,129).

Figure 3:
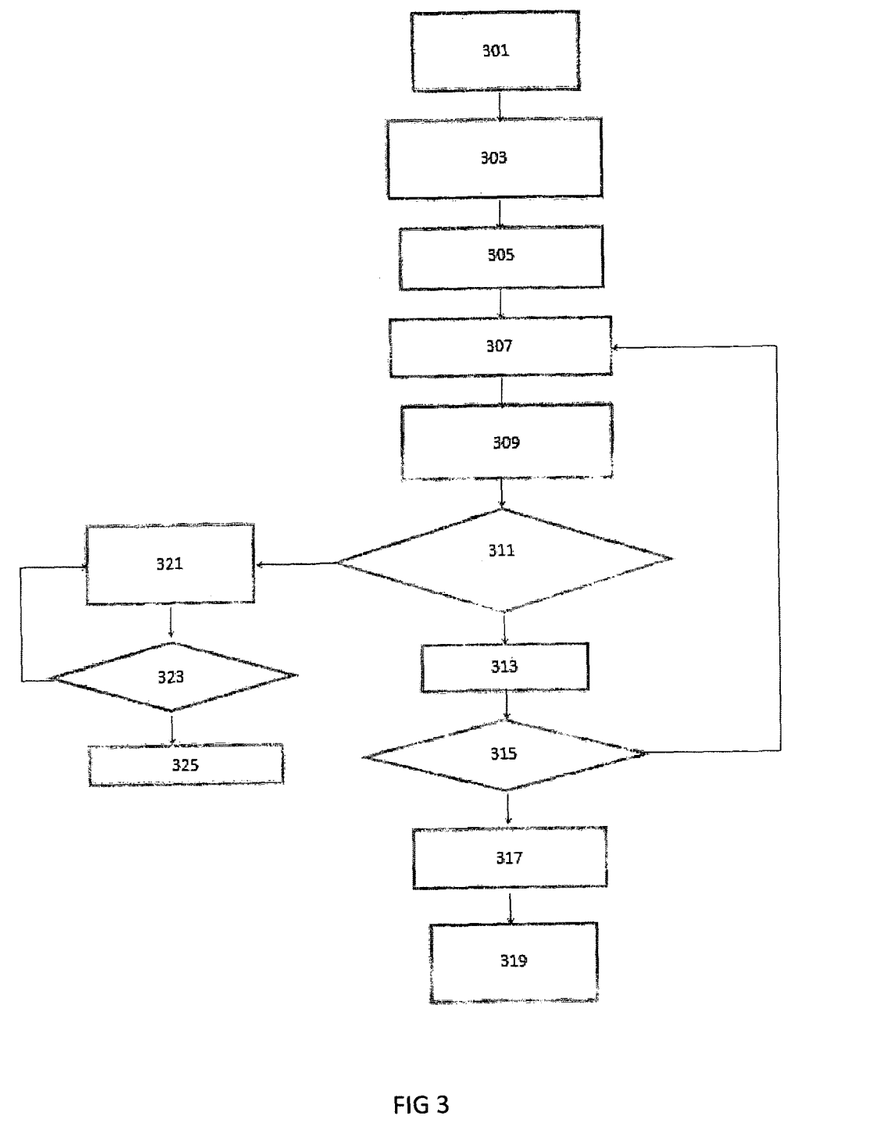
FIG. 3 is a flowchart showing a second part of a method for amending firmware data of an optical transceiver.

Turning now to FIG. 3, the process of changing the now-downloaded firmware will be described. This takes over from block (123) of FIG. 2, which will be recalled to be while the user is using the GUI.

At (301) the user initiates reprogramming the firmware data of the transceiver. At (303) the user accesses the software of the computer (11), which reads the serial number and existing firmware of the transceiver and the board ID into the computer (11). The computer (11) is programmed to store (305) a copy of the existing firmware, and then, via board (12) to cause the downloaded firmware data to be applied (307) to the transceiver. In one set of embodiments the computer (11) is programmed to store existing firmware data on a permanent basis. In other preferred embodiments the existing firmware data is only stored temporarily, and is later flushed out of store. Once this has been attempted, the computer (11) reads back (309) the data stored in the memory of the transceiver and in step (311) checks to see whether the write attempt was successful. If so control passes to a polling step (321) in which the computer awaits further instructions, and after which a decision (323) to exit the GUI is taken. Then the GUI is exited (325).

If the first write attempt was unsuccessful, block (313) adds one an iteration number of the process. Step (315) tests to see if the iteration number is less than or equal to a pre-determined number, in which case the process loops to write step (307). Thus, if the pre-determined number is 5, this looping continues for 5 iterations or until the write is deemed successful if before the fifth iteration is completed. If still unsuccessful step (317) causes the computer (11) to rewrite the stored copy of the previously existing firmware, and to issue an error message (319).

Figure 4:
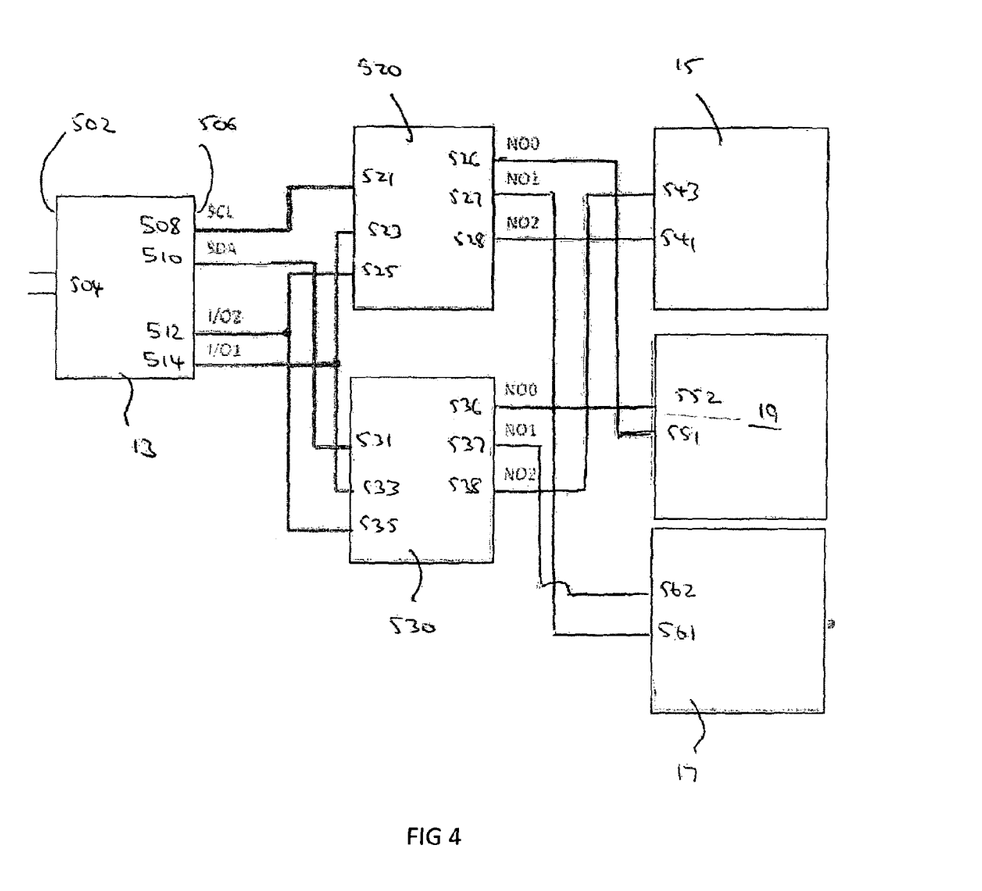
FIG. 4 is a block diagram of a circuit board and FIG. 5 is a further view of the computer of FIG. 1.

A more detailed description will now be given of the board (12) with reference to FIG. 4.

The bridging module (13) is for interfacing between USB and I2C. It has a USB side (502) with a connector (504) for connection to a USB port of a computing device such as a laptop to allow input and output of signals. It has an I2C (Inter-integrated circuit, I²C) side (506) providing a serial clock output node (508), a serial data output node (510) and first and second input/output nodes (512, 514)

The nodes (506-14) of the I2C side feed to two parallel switches (520,530), in one family of embodiments single pole triple throw switches, and in one specific embodiment TS5A3359 switches.

Each switch (520,530) has three inputs and three outputs.

The first input (521) of the first switch (520) is connected to the serial clock output node of the bridging module; the second input (523) to the second input/output node (514) of the bridging module (501) and the third input (525) to the first input/output node (512).

The first input (531) of the second switch (530) is connected to the data node (510) of the bridging module; the second input (533) to the second input/output node (514) of the bridging module (501) and the third input (535) to the first input/output node (512).

The EEPROM (electrically erasable programmable read only memory) (15) is, in this embodiment, a two-wire serial EEPROM.

The first switch (520) has three outputs (526-8) of which the first (526) connects to one module definition node (551) of the SFP connector (19), the second (527) to the serial clock node (561) of the XFP connector (17), and the third (528) to the serial clock node (541) of the EEPROM (540).

The second (530) has three outputs (536-8) of which the first (536) connects to the other module definition node (552) of the SFP connector (19), the second (537) to the serial data node (562) of the XFP connector (17) and the third (538) to the serial data line (543) of the EEPROM (540).

Software programmed into the computing device allows it to send commands to the bridging module, to control the analog switches (TS5A3359) to create a link between the I2C interface of the bridging module and to select one of the EEPROM or SFP connector or XFP connector.

In summary, after first installation, a customer or field service engineer, hereinafter referred to as a user, logs into the user interface of the system. Credentials are checked. Subsequently, user will input a unique Progkey adapted to be generated for a particular transceiver to use with a desired router (e.g. Cisco or Juniper). The Progkey may be associated with the serial no of the transceiver. A firmware corresponding to the Progkey is retrieved from the server and saved temporarily in the computing device.

Before the user initiates the process to flash the downloaded firmware into the transceiver, a transient copy of the existing firmware is created and stored in the field device. The system will also read back the internal flash memory after a write operation to confirm that the transaction is successful.

If there is no confirmation receipt, the system will re-write into flash memory for a predetermined number of iterations. After which, an error message could be prompted or the user could roll back to previous working condition, as long they do not exit out from the program or key in a new ProgKey).

The new firmware that is being downloaded has values required for calling AccessDevice( )—see later herein.

The software that is downloaded or otherwise obtained by the user may in some embodiments comprise a DLL (dynamic link library). In one embodiment, there are two functions that can be called on the DLL. When these functions are called, the bridging device (13) converts these functions to corresponding I2C commands to conduct the operations for re-flashing of the device.

These functions consist of:
1.) Public Function InitDevice(ByVal ComPortNum As String) As Byte
2.) Public Function AccessDevice(ByVal DevID As Byte, ByVal ReadWrite As Byte, ByVal SFPDevAddress As Byte, ByVal XFPPageNum As Byte, ByVal IntAdd As Byte, ByVal DataToWrite As Byte) As Byte( )

The InitDevice function initializes the bridging device (13) to its proper operation. This is called by putting in the COM port that corresponds to the bridging device (13) device (e.g., InitDevice("COM3")). This should be called first before the calling the AccessDevice function. The AccessDevice function is used to read/write on the SFP or XFP or the board EEPROM (15). The DevID parameter is used to select the peripheral that the software needs to communicate. The DevID parameter for SFP is 0, for XFP is 1 and for the board EEPROM (15) is 2. The ReadWrite is needed to indicate if the operation is read or write; a value of 0 means a Read and 1 means Write. So for a SFP (with two pages) example, if the SFPDevAddress is 0, it is accessing "1010000X". If it is 1, it is accessing "1010001X". The XFPPageNum specifies the page number on the XFP module to access. The IntAdd specifies which address internally on the SFP, XFP or HW ID EEPROM to read from (or write to). The DataToWrite is the data that needs to be written.

The board ID is stored in the board EEPROM (15). It can be written using the AccessDevice function in a per byte basis. For example, using AccessDevice (2, 1, 0, 0, 1, &HB), this will write the data to write &HB(0xB) to the internal address 0x1 in the board EEPROM (15). Depending on the length of the board ID, the AccessDevice function can be called again to write the remaining bytes.

When reading the board ID using the AccessDevice function, the DLL returns the first 256 bytes of data in the EEPROM. So it is best to store the board ID in addresses 0-255.

Figure 5:
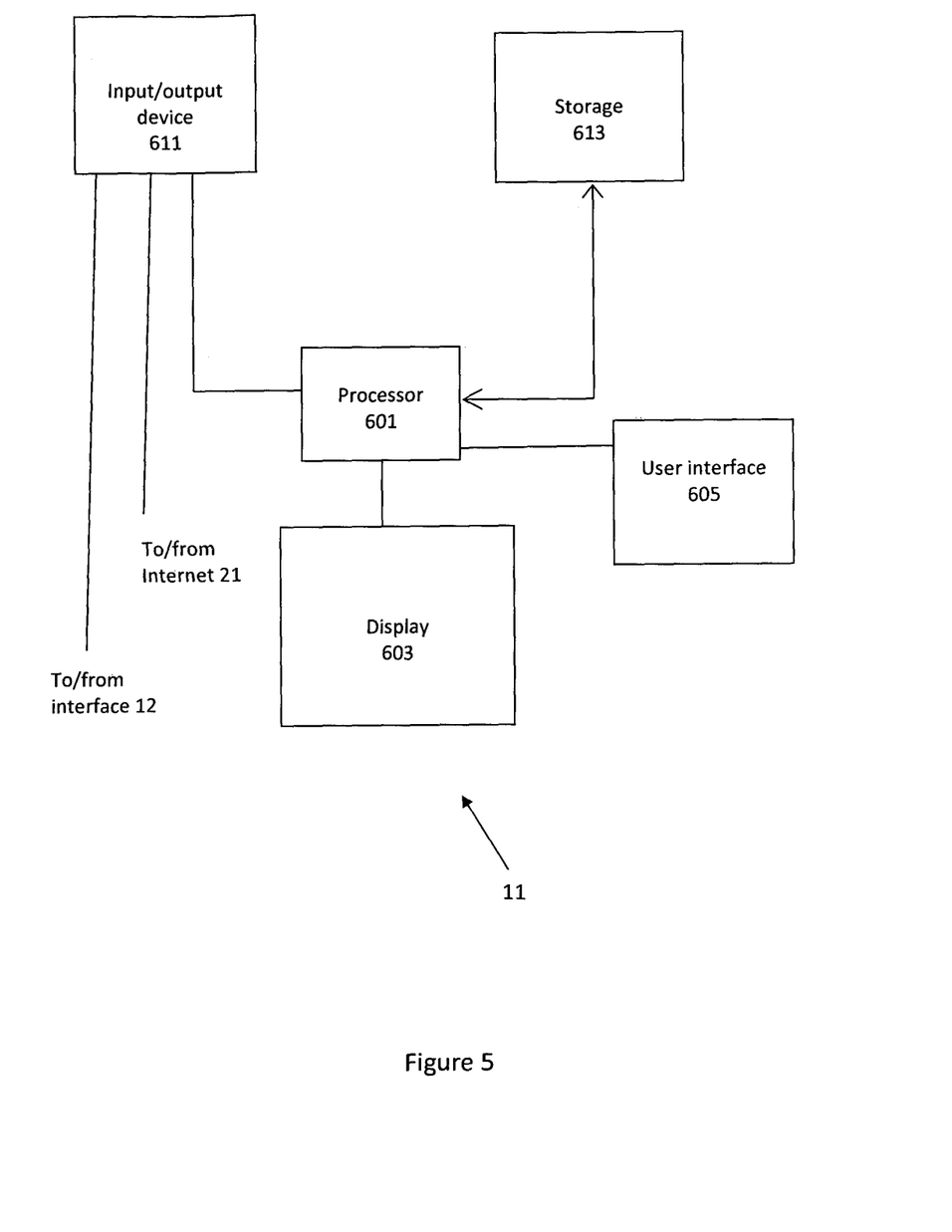

Referring to FIG. 5, the computer (11) in an embodiment has a processor device (601), eg a microprocessor, that is coupled to storage (613), to a display (603), to a user interface (605) for example a keyboard and mouse or a touch sensitive area of the display, and to an input/output device (611). The processor device (601) operates under control of instructions stored in the storage to perform the steps previously discussed with reference to for example FIGS. 1, 2 and 3. The input/output device (611) connects the processor device to and from the Internet (21) and to and from the interface (12).

Data from the Internet is accessed by the processor device (601) and passed to storage (613) in response to user inputs at the user interface. The data may include program instructions to cause the processor device to execute specific method steps. The data may include the downloaded data that is needed to flash the transceiver.

At appropriate times, the stored instructions cause the processor device to send data from storage (613) via the interface (12) to flash the transceiver, as described above. The instructions may cause the processor device (601) to interact with the transceiver as discussed with reference to FIGS. 2 and 3. In other arrangements, after the log in credential check, the user provides the serial number and current firmware (enabled to work with which switch e.g. Cisco, Juniper) of the transceiver in communication. Alternatively, the system reads from current firmware to determine serial number and host. The user may indicate the type of firmware to reprogram into that transceiver. From this info, program may be auto-generated (for example after payment through e-commerce) and stored in server or presented to customer for information. A unique Progkey could also be presented for future reference. Possible diagnostics may be built in—for instance any error code retrieved and send back to server.

In another embodiment, a field engineer visits the user with a device such as a laptop storing the relevant firmware. This may be stored as one of a library of firmware on the device. The engineer uses a board for example the board (12) described herein, to flash an optical transceiver.

It will be appreciated that the invention has been described by way of example only.

Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A method for programming an optical transceiver by downloading firmware data from a remote provider onto a computing device local to the optical transceiver and electronically writing data derived from the downloaded firmware data onto the optical transceiver using a hardware device connected electrically to the computing device, the optical transceiver being electrically connected to the hardware device at a socket of the hardware device, wherein the hardware device has a memory storing an identity of the hardware device, wherein the optical transceiver has onboard memory storing firmware data and storing data indicative of the optical transceiver including a transceiver ID, the method comprising:

reading the identity of the hardware device from its memory;

supplying that identity to a remote provider over the Internet;

in response to confirmation at the remote provider of the validity of the identity of the hardware device, sending the transceiver ID to the remote provider to select new firmware data corresponding to the transceiver ID and downloading the new firmware data from the remote provider into storage of the computing device;

outputting the new firmware data from the storage to the hardware device; and writing the new firmware data from the hardware device to the memory of the optical transceiver.

2. The method of claim 1 wherein the step of outputting the new firmware data comprises outputting the new firmware data using a first protocol, and further comprising a step of converting the new firmware data to a second protocol by the hardware device, wherein the writing step comprises writing the second protocol data to the optical transceiver.

3. The method of claim 2, wherein the first protocol is USB and the second protocol is I2C.

4. The method of claim 1, wherein before the step of outputting the new firmware data, the computing device reads the existing firmware of the optical transceiver and the identity of the hardware device into memory of the computing device via the hardware device.

5. The method of claim 1, wherein after the step of outputting the new firmware data, the computing device reads back data stored in the memory of the optical transceiver and checks to see whether the write attempt was successful by comparing with the stored new firmware data.

6. A method of operating an optical transceiver having a memory storing firmware data and a transceiver ID, the method comprising providing a computing device and an electrical interface device detachably connected between the optical transceiver and the computing device, the computing device being programmed to carry out the steps of:— accessing the memory of the optical transceiver via the electrical interface device to read the firmware data of the memory;

storing a copy of the firmware data;

accessing new firmware data; and carrying out a writing step to write the new firmware data to the memory;

wherein the step of accessing new firmware data comprises reading data indicative of the electrical interface device stored in the electrical interface device to check the validity of the electrical interface device; and if the electrical interface device is valid sending and using the transceiver ID to select the new firmware data.

7. The method of claim 6, wherein the computing device communicates with the electrical interface device using a first protocol, and the electrical interface device communicates with the optical transceiver using a second different protocol, the electrical interface device converting between the first and second protocols.

8. The method of claim 6, wherein the step of accessing new firmware data further comprises:

providing the transceiver ID to software running on the computing device, the software thereby contacting a cloud server of a remote provider to retrieve the new firmware data; and downloading the new firmware data to the computing device.

9. The method of claim 6, further comprising after carrying out the writing step, re-reading stored data from the memory and re-writing the stored copy of firmware data in event of an error.

10. The method of claim 6, further comprising, after carrying out the writing step, detecting an error, performing the writing step again for a set number of times; and then if an error is detected re-writing the stored copy of firmware data.

11. The method of claim 6, further comprising downloading a dynamic link library to the computing device.

12. The method of claim 11, wherein the dynamic link library permits control of the electrical interface device.

13. The method of claim 6, comprising downloading a graphical user interface and using the graphical user interface in effecting other steps of the method.

\* \* \* \* \*